United States Patent

[11] 3,627,361

| [72] | Inventor | Charles W. Bimba<br>101 Main St., Monee, Ill. 60449 |
|---|---|---|
| [21] | Appl. No. | 770,917 |
| [22] | Filed | Oct. 28, 1968 |
| [45] | Patented | Dec. 14, 1971 |
| | | Continuation-in-part of application Ser. No. 646,052, June 14, 1967, now Patent No. 3,426,656. This application Oct. 28, 1968, Ser. No. 770,917 |

[54] FLUID MOTOR WITH A REMOVABLY LOCKED PISTON ROD CONNECTION MEANS
3 Claims, 3 Drawing Figs.

| [52] | U.S. Cl. | 287/20 P |
|---|---|---|
| [51] | Int. Cl. | F16j 7/00 |
| [50] | Field of Search | 287/20, 20 P; 92/255, 258 |

[56] References Cited
UNITED STATES PATENTS

| 2,726,887 | 12/1955 | Pierotti | 287/20 P |
|---|---|---|---|
| 2,750,240 | 6/1956 | Naab | 92/255 X |
| 2,768,037 | 10/1956 | Payne | 287/20 X |
| 3,289,726 | 12/1966 | Sauter | 85/8.8 X |
| 3,319,508 | 5/1967 | McCormick | 85/8.8 |
| 3,397,727 | 8/1968 | Orosz | 85/8.8 X |
| 3,426,656 | 2/1969 | Bimba | 92/255 |

FOREIGN PATENTS

| 11,339 | /1893 | Great Britain | 287/135 |
|---|---|---|---|
| 1,059,198 | 11/1953 | France | 92/255 |
| 1,124,542 | 7/1956 | France | 85/8.8 |
| 560,738 | 7/1958 | Canada | 287/20 |

*Primary Examiner*—Andrew V. Kundrat
*Attorney*—Philip T. Liggett

ABSTRACT: In an air cylinder or other fluid motor unit, a special connection means is provided which eliminates the problem of having threading on the end of the piston rod itself and in lieu thereof has a split ring in a groove positioned near the end of the rod such that a "slip-on" threaded locking nut attachable to the work load piece can bear against the ring and clamp the rod tightly into a rod receiving recess within such workload piece. Split-ring and clamping nut or bushing type connection means for the piston rod may also be provided for threadfree attachment to the piston in the motor unit.

PATENTED DEC 14 1971

3,627,361

Air Cylinder   Mounting Plate   Machine Part

INVENTOR:
Charles W. Bimba

BY:
Philip J. Liggett
ATTORNEY

FLUID MOTOR WITH A REMOVABLY LOCKED PISTON ROD CONNECTION MEANS

This application is a continuation-in-part of my previously filed application, Ser. No. 646,052, filed June 14, 1967 and now U.S. Pat. No. 3,426,656.

The present invention is directed to an improved readily removable means for connecting a piston rod from an air cylinder or other similar form of fluid motor to a machine or other work load piece. More specifically, there is utilized a split ring in a groove on the piston rod and a "slip-on" threaded locking nut that is attachable to the workload and designed to bear against the ring that provides a tight clamping of the rod into a rod-receiving recess in the work load.

Where desired, the construction of the cylinder unit may be such that it also utilizes the split-ring and threaded locking bushing means at each end of the piston rod so that both the interior and exterior ends of the rod are readily removable, or attachable, to respectively the piston and the external workload to which the air cylinder is effecting movement.

The conventional method of making a connection of a piston rod to machine or workload piece is by threading the rod and making a threaded attachment to such workload. The treading on the rod is troublesome in that it leads to rapid rod failure. Any side thrusts and bending moments on the piston rod from the workload automatically causes high fiber stresses in the rod at the zone of the threads and with repeated reciprocating operations there is fatigue and failure in the treaded area. To compensate for thread failures, rods were made oversized and heat treated. Also, rolled threads have been used in prior art methods in an attempt to decrease the weakening effect of sharp machine cut threads.

Inasmuch as many air cylinders are constructed with fixed or nonremovable end portions so that the piston is not removable or accessible, the damaging of the outer end of the piston rod means the discarding of the entire cylinder unit. On the other hand, where merely the external end of the rod is damaged, then the use of replaceable connection, eliminating weak threads on the rod itself, will mean a large savings in unit replacement costs and in overall operating costs.

It may be considered a principal object of the present invention to provide a fluid motor unit with a piston rod connection means that eliminates rod threading on the workload end and which is subject to rapid failure because of rapid reciprocating operations and bending moments that in turn lead to high outer fiber stresses on the threaded zone of the rod itself.

It is also an object of the present invention to provide an improved piston rod connection means which will permit rapid replacement or repair of damaged rod ends and thereby permit in situ air cylinders to be salvaged and reused so as to keep operating costs at a minimum level.

Broadly, the present invention relates to an improved form of air cylinder or fluid motor unit which provides for the ready attachment and removal of the piston rod from a machine or workload piece in a manner which comprises in combination, a flat faced groove spaced a short distance from the outer end portion of the piston rod member and, in addition, a smooth bearing surface for the end of said rod member sized and adapted to fit into and bear against an inner bearing surface within a recessed rod receiving socket of a workload piece, a fully split ring member sized to slip-fit into said groove of said piston rod member and project outwardly from the rod surface and provide a transverse and perpendicular bearing surface, and a locking bushing positioned around and sized to be a slip-fit over the piston rod, with said bushing having an end portion sized to bear against said split ring member in the groove of the rod, and said locking bushing further having a threaded portion sized to engage a threaded recessed portion of said workload piece, the latter recessed portion being in axial alignment with first said recessed socket and of larger diameter to permit entry of said split ring member, whereby the tightening of said bushing therein effects a resulting pressure against split ring and a tight holding of the end of said piston rod member into the rod receiving recessed socket portion of the workload piece.

In another aspect, the present invention provides a special piston rod with a groove, split ring means and a slip-fit locking bushing at the external end of the rod, whereby there may be easy connection of the rod to the workload.

As will be seen, there is a particular advantage to having a construction means which permits the easy repair of the connecting parts of a piston rod member and the salvaging of the main cylinder housing and piston member of the unit. As previously noted, where there is a high incidence of damage or wear to piston rods so that in a construction where there is easy replacement of the rod member, or of the wearing parts of the rod, then there is a greatly extended life for the main portion of the fluid motor unit and a resulting economy in the use of the improved form of air cylinder means.

Although the present invention is directed to a rod connection means which is free of threads on the rod itself at the workload end, there may desirably be a form of piston rod construction which utilizes a groove spaced from each end of the piston rod and an accompanying split ring member for each groove such that there may be slipover locking nuts or bushings utilized at each end of the piston rod. One locking bushing is provided for a threaded connection with the piston member so as to tightly hold the internal end of the piston rod into a specially recessed portion of the piston itself. Thus, there is a similar connection to that of the external end of the piston rod where a slip-on nut will serve to bear against the other split ring member and provide a tight locking and holding of the rod into or against a machine or machine part that is being reciprocated by the action of the fluid motor unit.

Reference to the accompanying drawing and the following description thereof will serve to better illustrate an embodiment of the present fluid motor unit with improved piston rod connection means, as well as set forth additional advantages obtained in connection with the use thereof.

Figure 1:
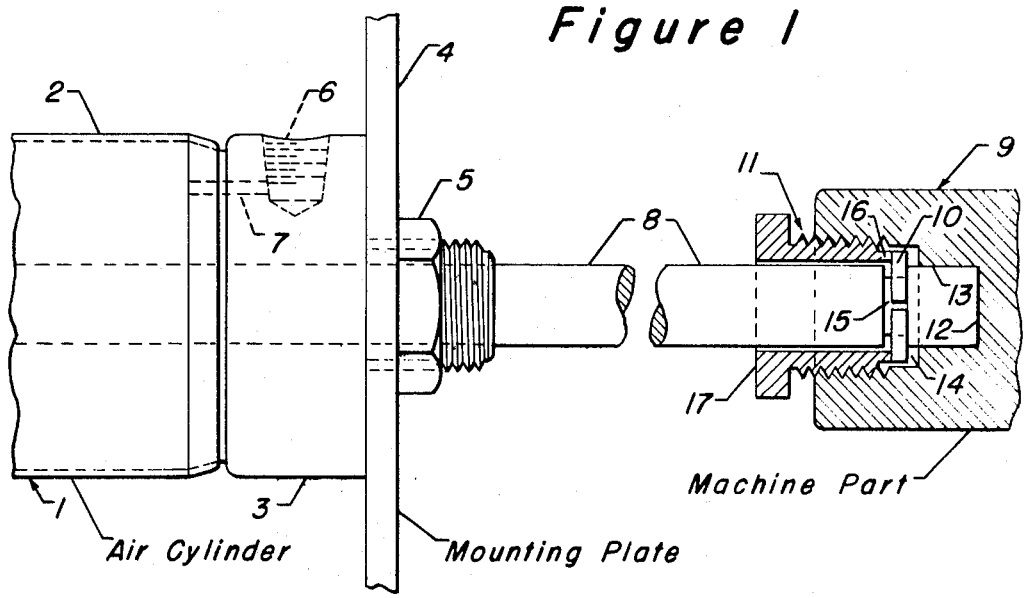
FIG. 1 of the drawing shows, diagrammatically and partially in section, an assembly view providing for the connection of the external end of a piston rod with a machine part.

Referring now particularly to FIG. 1 of the drawing there is shown an air cylinder 1 with a cylindrical body portion 2 and an end section 3. The latter is shown as being clamped to a suitable mounting plate 4 by an external locking nut 5 whereby to provide a suitable support for the entire motor unit 1. An air inlet or other fluid inlet part means 6 is shown within the end section 3 and such part, in turn, communicates with a fluid passageway 7 that carries to the inside of the cylinder body 2. Although not shown, the interior of the unit is provided with a piston and an elongated piston rod member 8 which in this instance extends axially through the end section 3 to connect with the reciprocating piston.

In accordance with the present invention, the piston rod member 8 will be removably held within and connected to a machine or workload piece 9 by the novel arrangement of using a split ring 10 and a locking bushing 11. The workload piece 9, or an adapter, is specially fabricated to have a blind end portion 12 which forms a stop at the end of a short rod-receiving opening or socket 13 and, in addition, has an enlarged internally recessed portion 14 that is sized to permit the insertion of the split ring member 10 to work out of a groove portion 15 within rod 8. In the present embodiment, the outer part of the internal recessed portion 14 of the member 9 is threaded to accommodate external threading on the locking nut or bushing 11. Thus, the latter can be tightened within the workload piece 9 and have an end bearing portion 16 contact the split ring 10 which in turn will push against the groove wall of the piston rod member 8 to hold it within the socket portion 13 and tightly against the blind end wall 12. The enlarged flanged portion 17 on the lock nut 11 may have flattened sections, or be knurled, such that a wrench may be used for effecting the tightening of the bushing 11 into the member 9.

Figure 2:
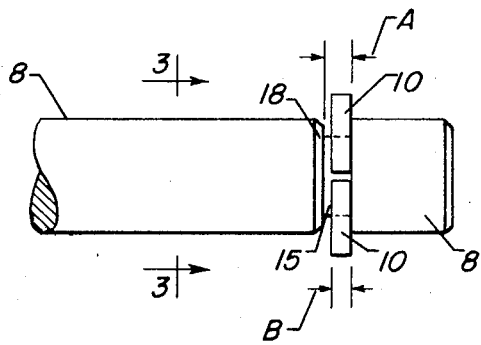
FIG. 2 of the drawing shows, in a partially enlarged view, the positioning of a split ring member within a groove formed in the piston rod, so as to point out the lack of the need for a close fit or tolerance between the split ring and groove portions.
Figure 3:
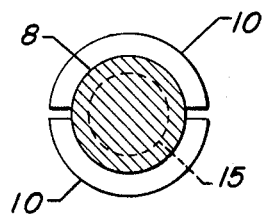
FIG. 3 of the drawing indicates in a cross-sectional view through the piston rod member an elevational view of the split ring member within the groove of the piston rod, as shown by the line 3—3 in FIG. 2.

As better shown in the enlarged views of FIGS. 2 and 3, the split ring member 10 need not be of a tight fit within the groove 15 on the piston rod member 8. As long as the width of groove "A" may be somewhat larger than the width of the ring "B" there will be resulting inexpensive machining and construction costs for the entire connection arrangement. However, in order to attain good bearing surfaces for effecting the tight locking of the rod to the connecting member, the groove 15 will preferably have square cut and flat perpendicular bearing surfaces, particularly for the surface nearest the end of the rod, for contact with corresponding flat wall surfaces on the split ring member 10. Still further, the depth of the groove 15 shall be sufficient to attain a desired adequate bearing surface with the split ring 10, but not so deep as to cause excessive weakening of the piston rod member 8.

For assembly purposes, the split retainer ring means 10 will generally be of two parts, as noted in FIG. 3, such that there may be easy insertion of the ring member into the groove 15. Also, as has been noted, the diameter of the recessed portion 14 in member 9 shall be constructed or formed to a dimension to be only slightly larger than the external diameter of the resulting split ring member 10 after its insertion into rod member 8. This will insure the proper holding of split ring 10 within the groove 15 after insertion of the end of the piston rod into the work member 9.

In a special embodiment of the improved air cylinder or fluid motor unit the internal end of the piston rod 8 will also be provided with a groove and split ring means, as well as a slip-fit locking nut or bushing so as to provide threadfree rod connection to the internal piston of the unit. Thus, in a construction which is similar to that used for the external end of the piston rod 8 the piston will have an internal recess portion for encompassing a split ring member and a rod-receiving socket portion, having a blind end or bearing face, to hold the work the internal end portion of rod 8. Internal threading, or other clamping means can be used to accommodate external threading on a bushing so that there may be a tight holding of the rod into the piston member. By having this construction arrangement, there is easy removability of the piston rod from both the machine part and the air cylinder piston whereby an entire new piston rod may be connected into operation within a manner of minutes and there is an economical salvaging of the old piston and air cylinder housing.

It may be pointed out that still other modifications may be made within the scope of the present invention, particularly with respect to details or the shapes and configuration of parts. For example, different types of retainer rings and groove shapes may be involved to provide for the desired bearing faces between the two and for the end of the locking nut. Still further there may be variations in the type of shape of the locking bushing and the threaded attachment with respect to the piston member. As a modification, there may be a cap screw type of clamping through the flange of a locking bushing into the piston, rather than the threaded attachment. As still another variation, there may be external threading on a hub portion of the machine or work piece and an internal threading arrangement on a portion of the locking bushing so that the latter fits over and accommodates itself to the external threading on the hub portion. In any case, there shall be a slip-on type of lock means and an effective axial movement with respect to the tightening adjustment between the locking means and the hub or threaded recess such that there may be bearing against the split ring member 10 and a tightening of the entire end of the rod 8 into an internal recessed socket portion of the workpiece.

For the purpose of assisting the passage of the piston rod through a pressure seal in the end section 3 of the fluid cylinder unit, there is shown a chamfer 18 on the outer edge of the internal perpendicular surface of wall of groove 15. A chamfer is preferably not provided for the outermost face of the groove since it will be receiving the thrust of ring 10 from locking bushing 11.

I claim:

1. In a fluid motor unit having an internal reciprocating piston member operating responsive to fluid pressures being introduced into the cylinder portion of the motor unit and at least one piston rod member connecting to the piston member and extending longitudinally through the motor housing to in turn provide movement to a workload piece, the improved construction providing a thread-free outer end for said piston rod member, which comprises in combination, a flat-faced groove spaced a short distance from the outer end portion of the piston rod member and, in addition, a smooth bearing surface on the end of said rod member sized and adapted to fit into and bear tightly against an inner bearing surface within a recessed rod receiving socket of a workload piece, a fully split ring member sized to slip-fit into said groove of said piston rod member and project outwardly from the rod surface and provide a transverse and perpendicular bearing surface, and a locking bushing positioned around and sized to be a slip-fit over the piston rod, with said bushing having a flat end portion sized to bear against said split ring member in the groove of the rod, and said locking bushing further having a threaded portion sized to engage a threaded recessed portion of said workload piece, the latter recessed portion being in axial alignment with said first recessed socket and of larger diameter to permit entry of said split ring member, whereby the tightening of said bushing therein effects a resulting pressure against said split ring and a load bearing tight holding of the end of said piston rod member against the end of the rod-receiving recessed socket portion of the workload piece.

2. The improved fluid motor unit of claim 1 further characterized in that the groove of said piston rod has a transverse perpendicular bearing surfaces adapted to accommodate said split ring member and provide transverse straight bearing surfaces therebetween and said split ring member has a bearing surface projecting beyond said groove to accommodate the end portion of said locking bushing.

3. The fluid motor unit of claim 1 further characterized in that said locking bushing is provided with external threading sized to engage internal threading on a body portion of the workload piece, whereby as the bushing is tightened there is bearing and locking against said split ring within said groove of said piston rod.

* * * * *